Patented July 14, 1931

1,814,654

UNITED STATES PATENT OFFICE

MERRILL A. YOUTZ, OF CHICAGO, ILLINOIS, ASSIGNOR TO STANDARD OIL COMPANY, OF WHITING, INDIANA, A CORPORATION OF INDIANA

PRODUCTION OF CETYL ALCOHOL

No Drawing.  Application filed August 1, 1927.  Serial No. 210,018.

This invention relates to cetyl alcohol. Attempts have heretofore been made to produce cetyl alcohol by saponifying spermaceti with alkali in the presence of alcohol and water and extracting the cetyl alcohol by a suitable solvent. These attempts have heretofore failed to result in a commercial process on account of outstanding difficulties which arise therein. Particular difficulties which have been experienced are a tendency for the whole mass to form a gel and a tendency to form slow breaking emulsions and suds during the extraction.

It has now been found that these difficulties can be avoided by carefully proportioning the relative amounts of wax, alcohol and water in the saponification mixture, in general, I find that for satisfactory extraction, the amount of alcohol in the hydrolized mixture must not fall below two parts of alcohol to three parts of water. It must be understood however that I do not intend to be limited to this figure since the relative amount of alcohol to water will vary in accordance with the nature of the alcohol used as a solvent, the temperature, the mechanical agitation applied and the nature of the extraction liquid. On the other hand the combined amount of alcohol and water must be controlled and limited because the mixture tends to develop cloudiness and suds when dilute.

It is preferred to employ ethyl alcohol as the solvent alcohol. Other alcohols may be used, particularly methyl alcohol. Propyl alcohols and higher alcohols may be used but are not so suitable as methyl and ethyl alcohols, particularly when petroleum ether is used as the extraction solvent, since they are more soluble in petroleum ether.

As the extraction solvent I prefer to use petroleum ether or other low boiling petroleum distillate. The invention is not limited to petroleum distillates since other liquids may be used provided they dissolve cetyl alcohol and are substantially insoluble in the alcohol, water menstruum.

The invention will be more completely understood from the following specific example:

100 grams of spermaceti are added to 100 cc. of 95% ethyl alcohol and heated together until the wax melts. 12 grams of potassium hydroxide in about 10 to 12 cc. of water are added slowly to prevent boiling by heat of reaction. The mixture is stirred and the two layers mix in a minute or two. The mixture is warmed and agitated for a quarter of an hour, and is transferred to one liter separating funnel, and 75 cc. of alcohol and 200 cc. of water are added.

While the mixture is still slightly warm 400 cc. of petroleum ether are added and shaken vigorously. If a gel or a slow breaking emulsion forms 10 cc. of alcohol are added at a time and the funnel reshaken until, on standing, the layers separate readily.

The aqueous layer is drawn off and extracted about four times with 200 cc. portions of petroleum ether. The solvent is evaporated from the combined extract by distillation and finally by blowing a current of air over it on a steam bath or under vacuum.

| Extraction No | 1 | 2 | 3 | 4 | 5 |
|---|---|---|---|---|---|
| Cetyl alcohol grams | 22.6 | 9.8 | 5.6 | 3.8 | 3.0 |

Total yield. Calculated 51.6 grams. Found 44.8 grams.
Melting point 45–46° C.

Although the present invention has been described in connection with the details of a specific example thereof, it is not intended that such details shall be regarded as limitations upon the scope of the invention except in so far as included in the accompanying claims.

I claim:

1. The method of producing cetyl alcohol which consists in hydrolyzing spermaceti and extracting the cetyl alcohol from a water, alcohol mixture by a solvent which is substantially immiscible with said mixture, and adding alcohol thereto to prevent formation of gels and emulsions.

2. The method of producing cetyl alcohol which consists in hydrolyzing spermaceti and extracting the cetyl alcohol from an alcohol, water mixture containing not less than 2/5 by volume of alcohol, by a solvent for cetyl alcohol immiscible with said mixture.

3. The method of producing cetyl alcohol which consists in hydrolyzing spermaceti and extracting the cetyl alcohol from a water, ethyl alcohol mixture by a solvent which is substantially immiscible with said mixture, and adding ethyl alcohol thereto to prevent formation of gels and emulsions.

4. The method of producing cetyl alcohol which consists in hydrolyzing spermaceti and extracting the cetyl alcohol from an ethyl alcohol, water mixture containing not less than 2/5 by volume of ethyl alcohol by a solvent for cetyl alcohol immiscible with said mixture.

5. The method of producing cetyl alcohol which consists in hydrolyzing spermaceti and extracting the cetyl alcohol from a water, alcohol mixture by petroleum ether, and adding alcohol thereto to prevent formation of gels and emulsions.

6. The method of producing cetyl alcohol which consists in hydrolyzing spermaceti and extracting the cetyl alcohol from an alcohol, water mixture containing not less than 2/5 by volume of alcohol by petroleum ether.

7. The method of producing cetyl alcohol which consists in hydrolyzing spermaceti in a water, ethyl alcohol mixture, extracting with petroleum ether, and adding ethyl alcohol thereto to prevent formation of gels and emulsions.

8. The method of producing cetyl alcohol which consists in hydrolyzing spermaceti and extracting the cetyl alcohol from an ethyl alcohol, water mixture containing not less than 2/5 by volume of ethyl alcohol by petroleum ether.

9. The method of producing cetyl alcohol which consists in hydrolyzing spermaceti with alkali in alcoholic soluton, diluting the mixture of water and extracting with petroleum ether.

10. The method of producing cetyl alcohol which consists in hydrolyzing 100 grams of spermaceti in 100 cc. of ethyl alcohol with about 12 grams caustic alkali in about 10 cc. of water, diluting the mixture with 75 cc. of alcohol and 200 cc. of water, extracting with petroleum ether and adding sufficient alcohol to prevent formation of gels or slow breaking emulsions.

MERRILL A. YOUTZ.